United States Patent [19]
Ramos

[11] 3,876,293
[45] Apr. 8, 1975

[54] MAKE-UP MIRROR

[76] Inventor: John J. N. Ramos, 1445 W. Roscoe St., Chicago, Ill. 60657

[22] Filed: Nov. 23, 1973

[21] Appl. No.: 418,620

[52] U.S. Cl. .............................. 350/305; 350/288
[51] Int. Cl. .......................................... F21v 33/00
[58] Field of Search ............... 240/4.2, 103 R, 105; 350/288, 299, 305, 306, 113; 40/219

[56] References Cited
UNITED STATES PATENTS

| | | | |
|---|---|---|---|
| 1,311,253 | 7/1919 | Stern | 350/288 |
| 1,805,798 | 5/1931 | Bedrossyan | 40/219 |
| 1,832,248 | 11/1931 | Schrader | 350/288 |
| 3,794,828 | 2/1974 | Arpino | 240/4.2 |

Primary Examiner—James W. Lawrence
Assistant Examiner—P. C. Anderson
Attorney, Agent, or Firm—Molinare, Allegretti, Newitt & Witcoff

[57] ABSTRACT

A mirror device for assisting a user to accurately compare facial features. Preferably, the mirror includes at least one mirror having a modified reflective surface and a light source. The reflective surface is modified by etching very fine, relatively thin lines in the reflective coating to define a light-passing grid pattern which becomes usably visible when illuminated by the light source. The grid pattern facilitates the comparison of various facial features.

5 Claims, 8 Drawing Figures

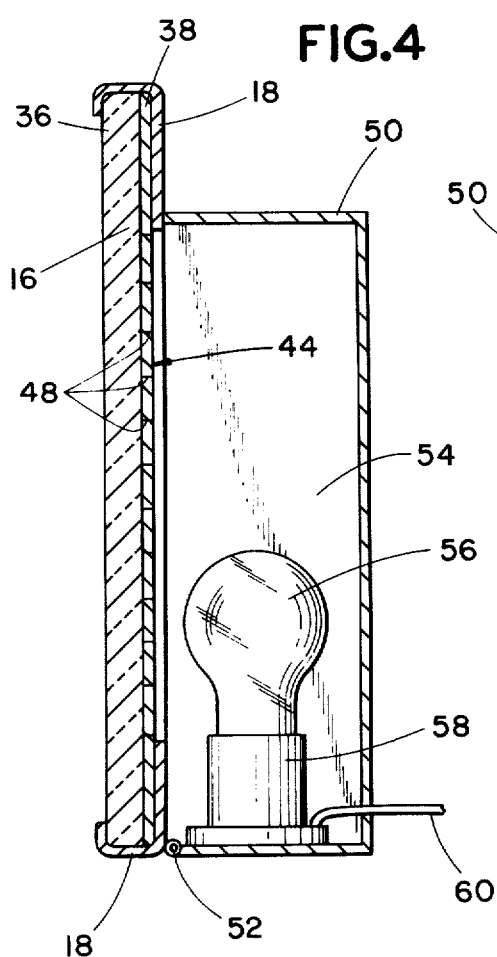
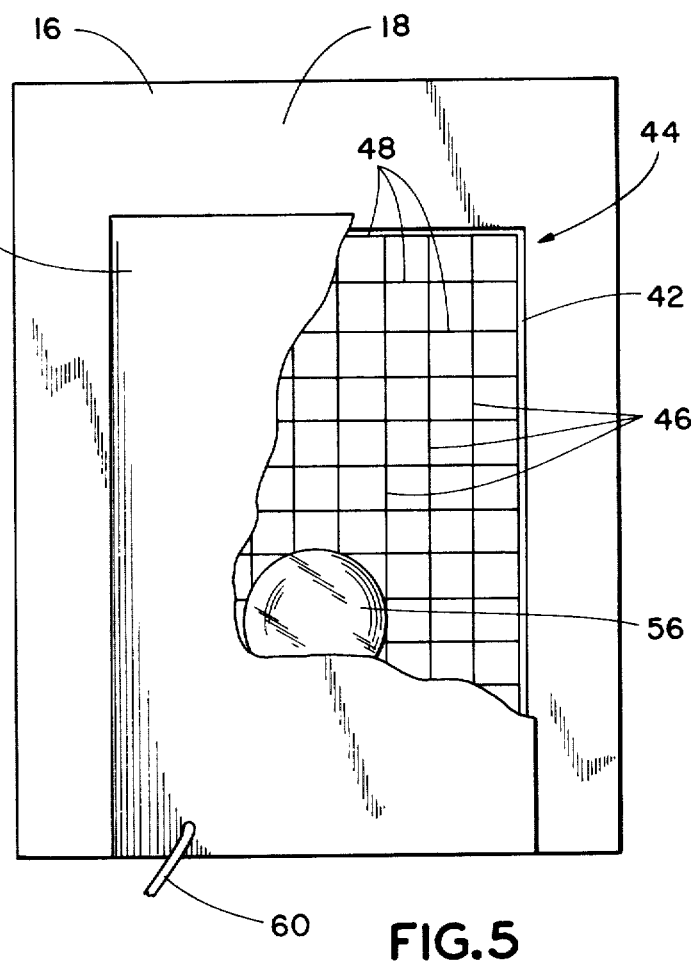
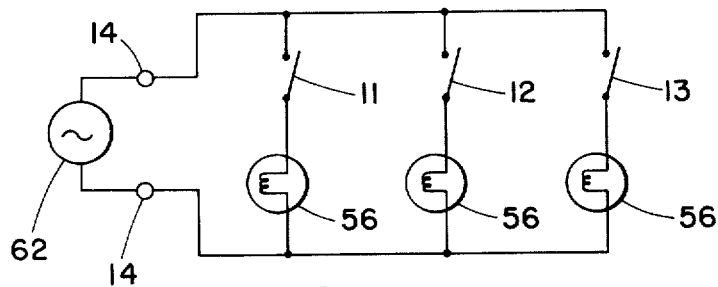
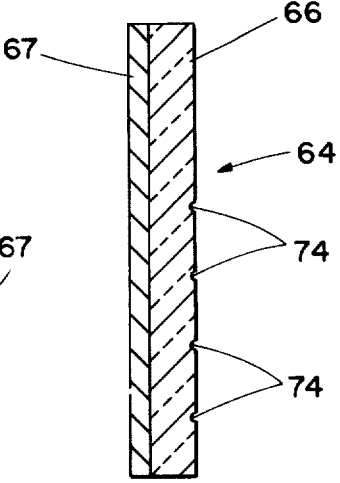
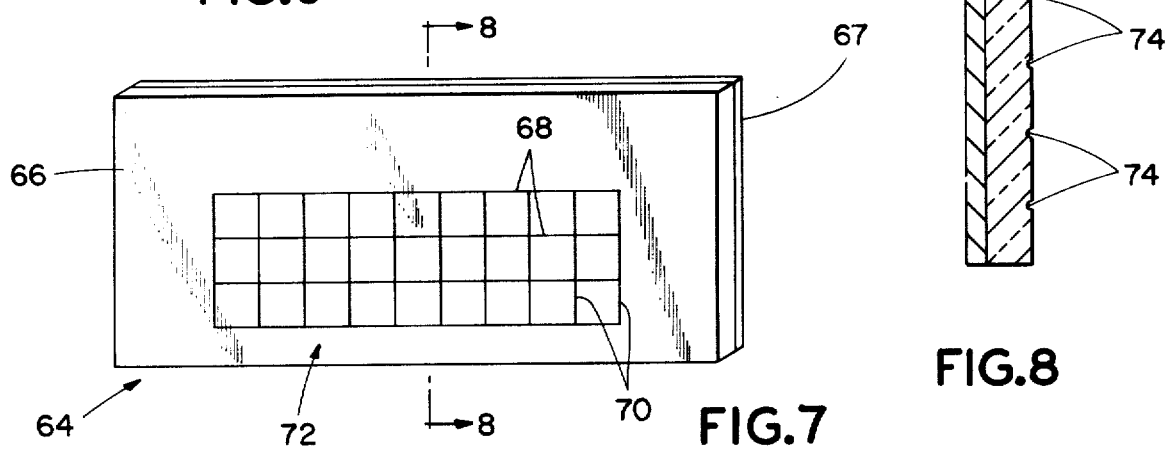

MAKE-UP MIRROR

BACKGROUND OF THE INVENTION

It is presently fashionable for men to wear mustaches and sideburns. These items, however, present various maintenance problems.

For example, it is very difficult to trim a pair of long thick sideburns, using a razor and mirror, into a matching set, i.e., to the point where the sideburns are of substantially the same length, width, shape and fullness. The halves of a mustache present a similar problem.

Women also encounter problems of this nature. Eye make-up is to be applied and worn in such a manner that the eyes give substantially the same appearance. The eyebrows, for example, should have similar length, width, shape and color.

In addition, many of the presently popular female hair styles have a part along the middle of the head. These parts must be both straight and properly positioned, and many women find this a very difficult grooming step to perform.

SUMMARY OF THE INVENTION

It is thus an object of the present invention to provide a mirror device which facilitates the comparison of various facial features and the performance of various grooming procedures and steps.

It is another object of the present invention to provide a mirror having a patterned reflective surface which does not effect or distort the reflected image.

It is another object of the present invention to provide an improved grooming mirror which can be easily and inexpensively manufactured.

These and other objects which will become apparent in the detailed description which follows are accomplished by providing a mirror having a pattern visible therein to assist the user of the mirror in accurately comparing facial features. Preferably, the pattern is in the form of a grid and is defined by a series of relatively thin, horizontal and vertical lines visible on the mirror surface. In a particularly preferred embodiment, the reflective coating of the mirror is etched to define a light-passing grid pattern and a light source is positioned behind the mirror. When the light source is illuminated the grid pattern becomes usably visible in the mirror face.

BRIEF DESCRIPTION OF THE DRAWING

Preferred embodiments of the present invention will be described in detail with reference to the following drawings wherein:

FIG. 4 is a cross-sectional view of the side mirror member shown in the preferred embodiment of FIG. 1, taken along line 4—4;

FIG. 5 is a partial cut-away back view of the side mirror member shown in the preferred embodiment of FIG. 1;

FIG. 6 is an electrical schematic view of a circuit for use in the preferred embodiment shown in FIG. 1.

FIG. 7 is a front perspective view of another embodiment of the present invention; and FIG. 8 is an enlarged cross-sectional view of the embodiment shown in FIG. 7 taken along line 8—8.

DESCRIPTION OF THE PREFERRED EMBODIMENT

Figure 1:
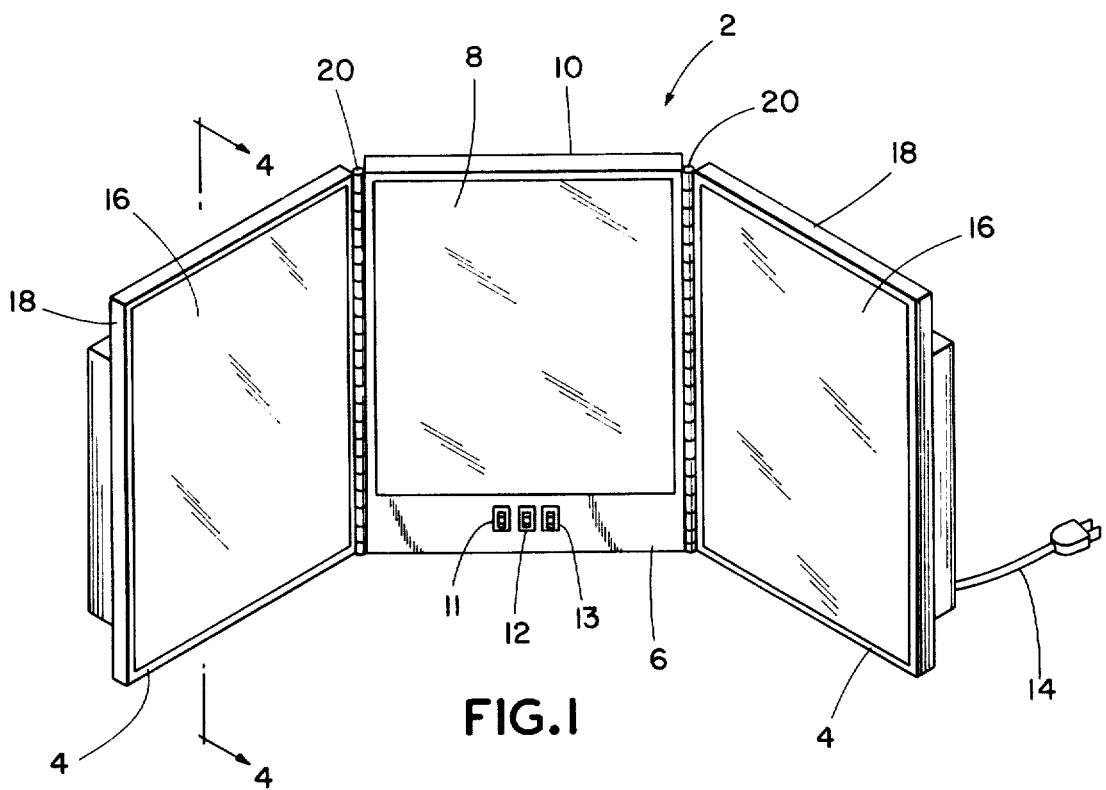
FIG. 1 is a front perspective view of a preferred embodiment of the present invention.

With reference to FIG. 1, a preferred embodiment of the present invention is shown and generally designated as mirror unit 2. The mirror unit 2 includes a pair of similarly constructed side mirror members 4, and a center mirror member 6.

The center mirror member 6 includes a mirror 8, which is rigidly secured in a frame 10. The frame 10 includes a series of switches, generally designated 11, 12, 13, which are electrically connected to a plug 14. The switches 11, 12, 13 and plug 14 will be described in detail below.

Each side mirror member 4 includes a mirror 16, which is rigidly secured in a frame 18. The frames 10, 18 are made of any suitable material, such as metal or plastic, and are pivotally connected by a pair of hinges 20. This configuration permits the side mirror members 4 to be set at any angle with respect to the center mirror member 6, and in addition, permits the mirror unit 2 to be folded into a closed state for storage.

Figure 2:
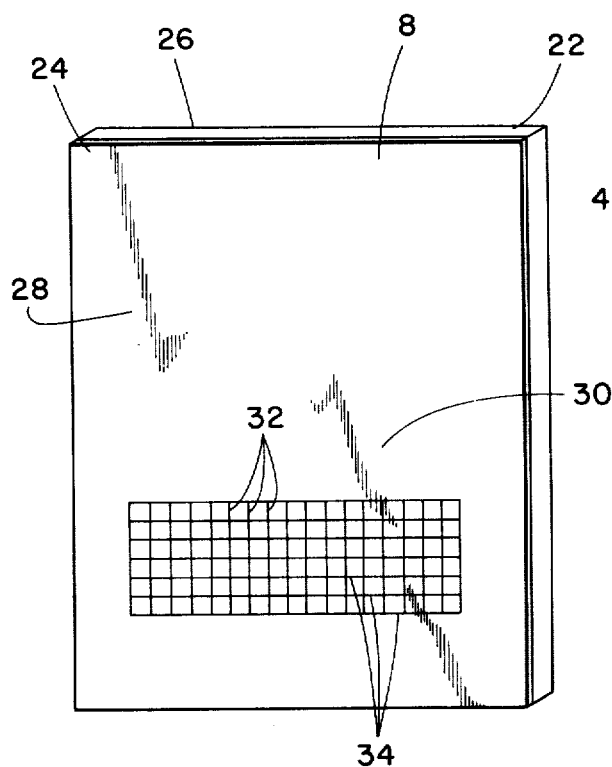
FIG. 2 is an enlarged, simplified back view of the center mirror shown in the preferred embodiment of FIG. 1.
Figure 3:
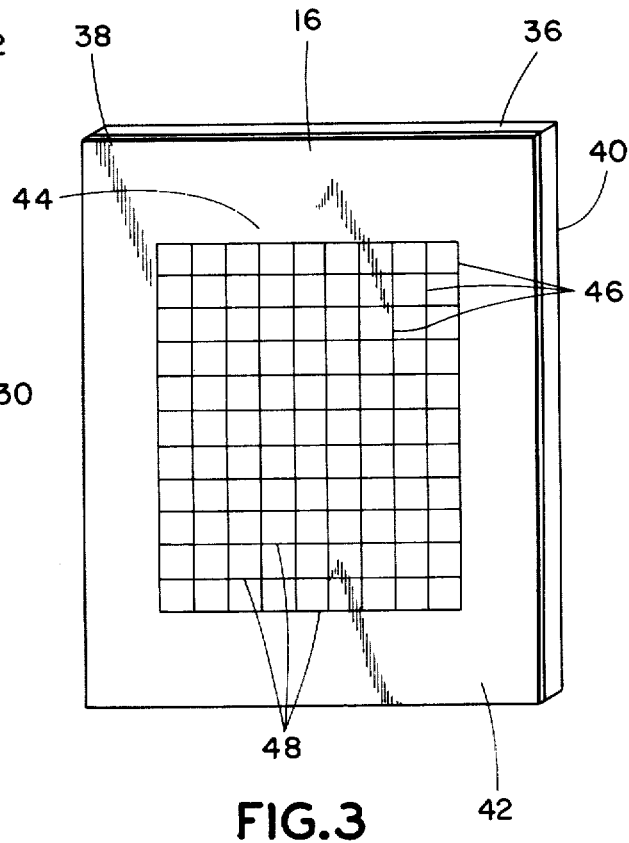
FIG. 3 is an enlarged, simplified back view of the side mirror shown in the preferred embodiment of FIG. 1.

Referring now to FIGS. 2 and 3, the mirrors 8, 16 are shown in greater detail. The mirror 8 includes a glass member 22 and a reflective coating or surface 24. As such, the mirror 8 has a front face 26 and a back face 28. It should be noted that the thickness of the reflective coating 24 has been exaggerated for the purpose of clarity.

The reflective coating 28, as shown, includes or defines a pattern, generally designated 30. The pattern 30 is a grid of equally spaced vertical lines 32 and horizontal lines 34. The lines 32, 34 are very thin, thread-like lines and are defined by the absence of reflective material in the reflective coating 28. Thus, the pattern 30 is a light-passing grid pattern. The thickness of lines 32, 34 has also been greatly exaggerated for the purpose of clarity.

The pattern 30 can be scratched or etched in the reflective coating 24 of a conventional mirror. Preferably, however, the mirror 8 is manufactured with the grid pattern 30.

Similarly, the mirror 16, shown in FIG. 3, includes a glass member 36 and a reflective coating 38, which define a front face 40 and a back face 42. The reflective coating 38 defines a light-passing grid pattern 44 comprising thin vertical lines 46 and longitudinal lines 48. As shown, the grid pattern 44 has different dimensions from the grid pattern 30 for reasons which will be discussed below.

The side mirror member 4 is shown in detail in FIGS. 4 and 5. Although only the side mirror member 4 is here described, it is to be understood that the center mirror member 6 is similarly equipped and constructed.

As shown, the side mirror member 4 includes a housing 50 pivotally connected to the frame 18 by a hinge 52. The housing 50 covers a portion of the back face 42 of the mirror 16. More specifically, the housing 50 encloses the lighting-passing grid pattern 44. The housing 50 may be of the same material as the frame 18.

The side mirror member 4 also includes a light source, generally designated 54, for illuminating the reflective coating 38 and grid pattern 44. The light source is secured within the housing 50 and includes a bulb 56, socket 58, and associated wiring 60.

With reference to FIG. 6, the electrical circuitry of the mirror unit 2 includes a power supply 62, representing ordinary household current. The mirror unit 2 is connected to the power supply 62 by the plug 14.

The switches 11, 12 and 13 independently control the operation of the bulbs 56 behind the side mirror members 4 and the center mirror member 6. In this manner, the light source 54 behind the mirrors 8, 16 can be selectively operated. Of course, a single switch can be supplied to simultaneously actuate all of the bulbs 56.

In the operational description which follows, reference will only be made to the side mirror member 4 shown in FIGS. 3, 4 and 5. It is to be understood, however, that operation of the center mirror member 6 is identical with that disclosed below.

When the bulb 56 is unlit, the grid pattern 44, is for practical purposes, invisible to the user of the mirror unit 2. The grid pattern appears only as a series of faint thread-like lines in the front face 40 of the mirror 16.

When the bulb 56 is lit, the emitted light passes through the grid pattern 44 and glass member 36, and thereby enunciates the grid pattern 44. The grid pattern 44 is, therefore, readily visible in the mirror 16.

The grid pattern 44 of the side mirror member 4 and the grid pattern 30 of the center mirror member 6 are significant features of the present invention because they permit the user of the mirror unit 2 to readily compare the size and location of various facial features. For example, by comparing his sideburns against the grid pattern 44 or his mustache halves against the grid pattern 30, a male user is immediately aware of any differences between the sideburns or mustache halves. In a similar manner, a woman can use the grid pattern 30 to quickly and easily locate the middle or center of her hair in order to make an appropriate part.

As previously discussed, the grid patterns 30, 44 comprise very thin lines in the reflective coatings 24, 38 of the mirrors 8, 16 respectively. As such, the grid patterns 42, 44 do not effect visual perception or distort the reflected image.

Applicant has discovered that a 5 × 6 inch grid of ½ inch squares, centrally located in the reflective coating 38 of the mirror 16, is particularly suitable for the side mirror members 4. A 2 × 6 inch grid of ¼ inch squares, located in the lower portion of the mirror 8, is preferable for the center mirror member 6. These patterns are shown in FIGS. 3 and 2, respectively.

Although any type of bulb 56 may be used, Applicant has also discovered that a colored bulb substantially softens the glare from the lighted grid pattern. Red or green bulbs, in particular, result in a readily visible grid pattern which is not unduly harsh and does not otherwise interfere with the use of the mirror. Access to bulbs 56 for replacement is accomplished by rotating the housing 50 about the hinge 52.

Another embodiment of the present invention is shown in FIGS. 7 and 8 and generally designated as a mirror 64. The mirror 64 has a front face 66, a reflective surface 67, and includes a series of relatively thin equally spaced horizontal lines 68 and vertical lines 70. The horizontal lines 68 and vertical lines 70 define a grid pattern 72.

As shown in FIG. 8, the face 66 of the mirror 64 is etched or scratched to form a series of fine equally spaced horizontal and vertical depressions 74. The lines 68 and 70 of the grid pattern 72 are painted in the depressions 74. In this embodiment, the grid pattern 72 is permanently visible in the mirror 64 and the light source 54, discussed above, is eliminated.

There has been provided a detailed description of particular embodiments of the present invention. It is to be understood, however, that all equivalents are to be included within the scope and spirit of this invention, as claimed below. For example, the mirror members 4, 6 can be secured to a vanity cabinet. In this embodiment, the side mirror members 4 are attached to the doors of the vanity cabinet which open about the hinges 20. In another embodiment, the shape of the side mirror members 4 is substantially trapezoidal and the housings 50 are modified such that the mirror unit 2 tilts backwards in the normally open and upright position.

What I claim is:

1. A mirror apparatus to assist a user in accurately comparing facial features comprising in combination:
   at least one mirror having a transparent front face and a reflective surface on the rear of said front face, said reflective surface having a light-passing rectangular grid pattern thereon comprising a plurality of spaced apart thin, transparent lines in the reflective surface, said thin lines being substantially invisible in said front face such that distortion of an image on the front face of said mirror is substantially avoided; and,
   means for visually establishing said thin lines in said reflective surface comprising lighting means positioned behind the rear reflective surface, said lighting means adapted to be actuated and to emit a colored light upon said reflective surface which passes through said light-passing grid without producing glare in said thin lines in said front face of said mirror when the lighting means renders the grid visible.

2. A mirror apparatus as in claim 1 which includes a housing secured to the back of the mirror, said housing enclosing said lighting means.

3. A mirror apparatus as in claim 1 wherein said lighting means includes at least one light bulb.

4. A mirror apparatus as in claim 1 where said colored light is red or green.

5. A mirror apparatus as in claim 1 which includes a center mirror and spaced apart side mirrors pivotally connected to each side of the center mirror, said center and side mirrors having associated therewith said light passing grid and said lighting means.

* * * * *